US005851019A

United States Patent [19]

Gill et al.

[11] Patent Number: 5,851,019

[45] Date of Patent: Dec. 22, 1998

[54] WHEEL CHAIR WITH INDEPENDENT SUSPENSION

[75] Inventors: Robert Gill, St. Petersburg; John Hudson, Largo, both of Fla.

[73] Assignee: Caribbean Billing International, Ltd, Nassau, Bahamas

[21] Appl. No.: 89,801

[22] Filed: Jun. 3, 1998

Related U.S. Application Data

[60] Division of Ser. No. 977,955, Nov. 25, 1997, Pat. No. 5,855,387, which is a continuation-in-part of Ser. No. 848,893, May 1, 1997, abandoned.

[51] Int. Cl.[6] .......... B62M 1/14

[52] U.S. Cl. .......... 280/286; 280/250.1; 280/304.1

[58] Field of Search .......... 280/250.1, 304.1, 280/283, 286; 297/DIG. 4; 180/907

[56] References Cited

U.S. PATENT DOCUMENTS 4,455,031 6/1984 Hosaka .......... 280/250.1

*Primary Examiner*—Brian L. Johnson
*Assistant Examiner*—Gary Savitt
*Attorney, Agent, or Firm*—Harold D. Shall

[57] ABSTRACT

A wheel chair has a rear swing axle pivotally connected to the seat frame and a spring shock absorber controls the relative movement therebetween. A front suspension is connected to the seat frame separately from the rear suspension and includes a floating beam carrying the front castor wheels and pivotally connected to the seat frame by four link control arms. Three shock absorbers acting between the front of the seat frame and the floating beam allow controlled vertical movement of the floating beam. A second embodiment has the rear wheels each connected by a separate swing arm pivotally connected to the seat frame at their front end and each swing arm also connected to the rear of the seat frame by a pair of control arms and spring shock absorber.

9 Claims, 6 Drawing Sheets

WHEEL CHAIR WITH INDEPENDENT SUSPENSION

This application is a divisional application of application Ser. No. 08/977,955 filed Nov. 25, 1997 now U.S. Pat. No. 5,855,387 which latter application was a C.I.P. of application Ser. No. 08/848,893 filed May 1, 1997, abandoned.

FIELD OF THE INVENTION

This invention relates to wheel chairs generally and more particularly to wheel chairs having an independent suspension configuration.

DESCRIPTION OF PRIOR ART

The general widely used wheel chair found today has an integrated structure so that both of the larger rear wheel along with both of the smaller front castor wheels are connected to the seat platform of the wheel chair in not only a rigid manner, but also such that all members are suspended in a dependent manner, that is, they are not capable of moving relative to the seat platform in an independent manner.

While a Powered Wheel Chair With—Independent Suspension is shown in U.S. Pat. No. 5,575,348, the structure disclosed therein does not have the shock absorbing characteristics or true independent features of the present invention. Without a true independent suspension wherein the front castor wheels are suspended independently of each other and also independent of the rear wheels a comfortable ride cannot be obtained. In a second embodiment, both the front and rear wheels are independently suspended. With the structure of the present invention, large steps such as encountered when going off a curb, can be accomplished by the rider without assistance and without bone jarring impact or damage to the wheel chair.

SUMMARY OF THE INVENTION

It is an object of this invention to provide a sturdy wheel chair which is comfortable to operate and which can accommodate large steps and bumps in its operation without damaging the wheel chair or causing discomfort or injury to the user.

To this end, in the first embodiment, the main occupant supporting chassis is suspended from a rear swing arm which carries the larger rear wheels and four link arms which extend forwardly with two of them operatively connected on each side of a floating beam. The floating beam carries at each of its opposed ends a castor wheel and a foot support on its medial portion, and is connected to the chassis by a plurality of vertically extending gas charged spring shock absorbers which allow vertical movement with control to prevent diving. The rear swing arm which carries the rear wheels, is connected to the chassis at its back end by a vertically extending shock-absorber spring device which has variable damping and spring rate adjustments. The rear swing arm and the four forwardly extending link arms are centrally connected to a pair of spaced supports fixedly carried by the seat supporting portion of the chassis. The location of the rear wheels relative to the rear swing arm are adjustably positioned for fore and aft adjustment to provide for front and back weight transfers. The rear wheel locks are carried by a support bracket connected directly to the rear wheel supports so movement thereof is in conjunction with the rear wheels.

In a second embodiment instead of both of the wheels being connected to the same swing arm and only a single shock absorber, each of the rear wheels has its own spring arm which is connected to the chassis by a pair of link arms and a separate spring shock absorber to each of two separate swing arms. This embodiment, for certain applications provides even more comfort in its operation than the first embodiment.

DETAILED DESCRIPTION OF THE PREFERRED EMBODIMENT

Figure 1:
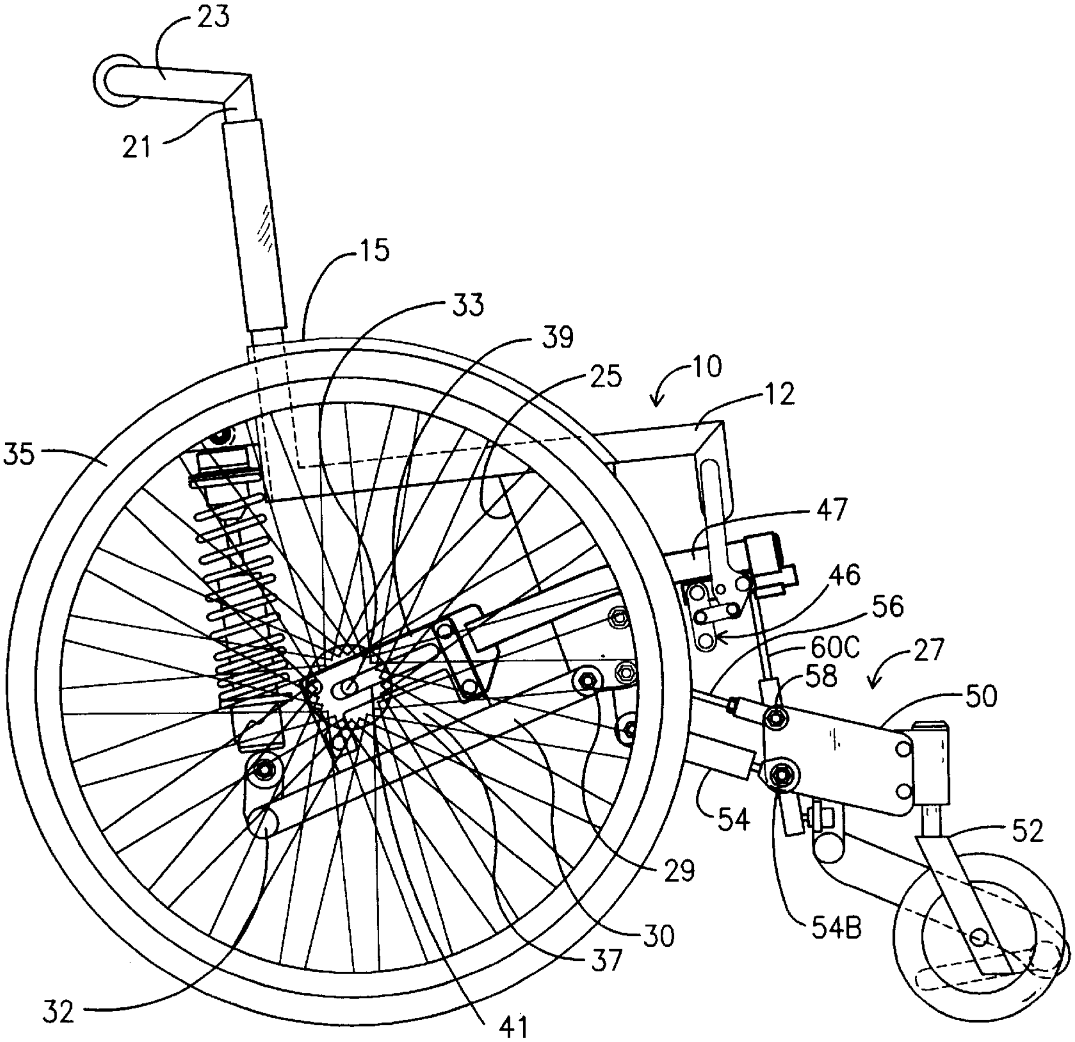
FIG. 1 is a side elevational view of a wheel chair made according to this invention.

Referring now to FIGS. 1–4 of the drawings, a seat frame shown generally at 10 includes a pair of laterally spaced side rails 12 and 14 interconnected at their front ends by a front cross member 16 and at their rearward end by a rear cross member 18. The front cross member 16 is displaced arcuately downwardly and the rear cross member 18 is displaced arcuately rearwardly so that when the seat 19, made of a durable material such as a high denier balistic nylon and suitably secured at its lateral edges to the rails 12 and 14, is sat upon, the sitters legs will not strike the front cross member 16 and the sitter's back will not hit the member 18. A back cover 20, which is also made of such durable material, is secured at its lateral edges to a pair of spaced back rails 21 and 22 suitably secured or formed integrally with the side rails 12 and 14 respectively, and joined at their top end by a top rail 23. The top rail 23 is bent arcuately rearwardly so as to avoid a sitters back and the intermediate portion thereof has a comfortable hand grip 24 which a party pushing the chair 10 can conventionally grasp. Side plates 15 and 17 are conventionally secured to the sides of the seat frame 10 to form the sides of the seating area.

The side rails 12 and 14 have attachments brackets 25 and 26, respectively which brackets are rigidly secured to the associated side rails at a location forward of the longitudinal midpoint thereof and extend downwardly from the side rail. The lower end of the brackets 25 and 26 provide the mounting location for the under carriage of the chair, that is, the front floating beam assembly shown generally at 27 and the rear single swing axle assembly shown generally at 28.

More particularly the axle assembly 28 is secured to the brackets 25 and 26 for pivotal movement in a vertical direction about the horizontal axis of a pair of mounting bolts 29 and 29A which pass through aligned openings in the front ends of the axle assembly 28 and in the brackets 25 and 26. The axle assembly 28 includes a swing arm comprised of a pair of generally longitudinally extending side members 30 and 31 (these members slope slightly downwardly from the front and end thereof toward the rear) interconnected at their rear ends by an arcuately shaped rear bar 32, and a cross brace 32A slightly forward of the rear bar 32 rigidly interconnects the side members at the location just below the axle spindles 33 and 34 which rotatably mount the usual and conventional wheel chair wheels 35 and 36.

Figure 4:
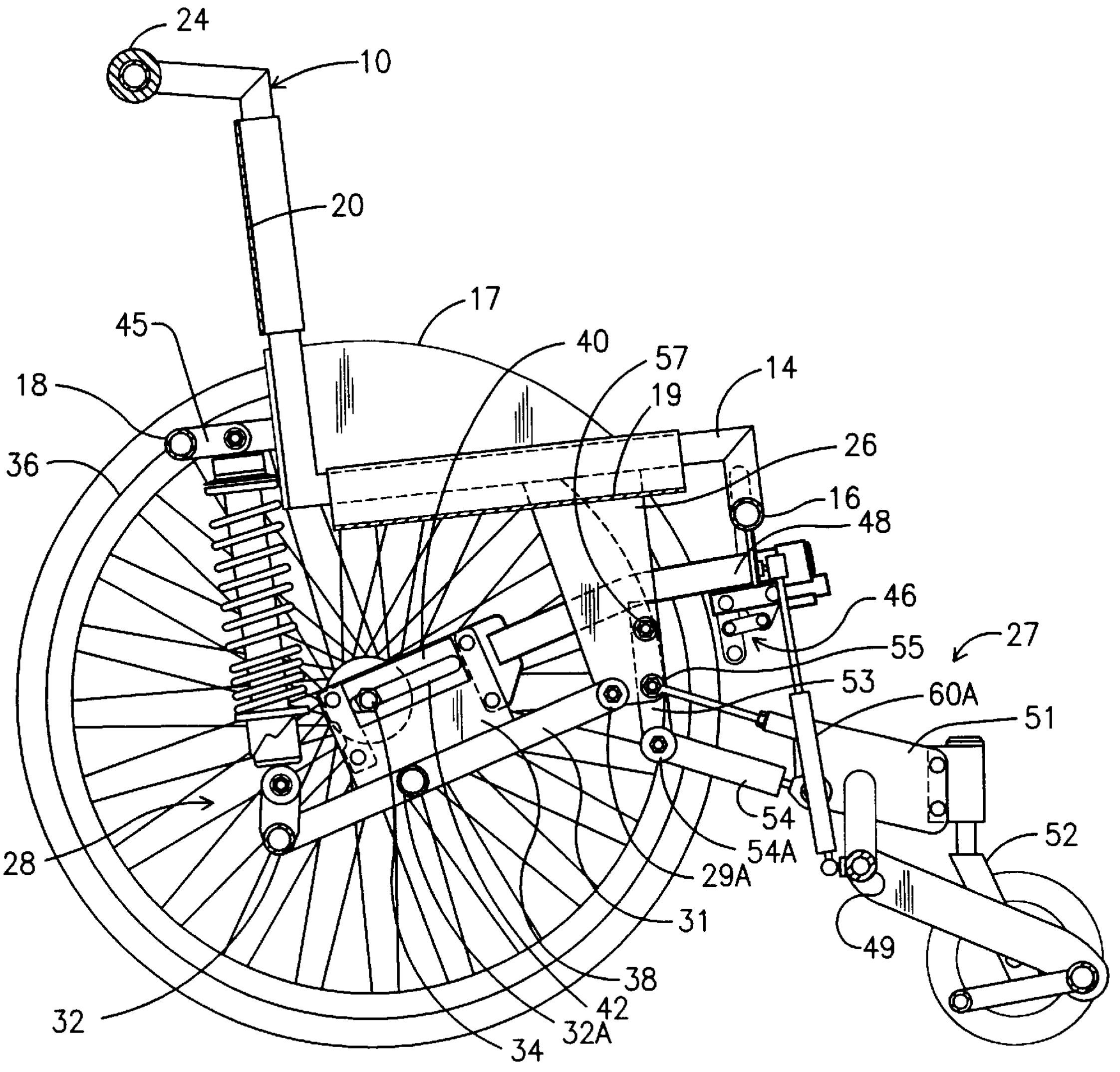
FIG. 4 is a sectional view taken along the line 4—4 in FIG. 3.

The mounting of the axle spindles to the assembly 28 will now be described in detail with respect to the wheel 36, as seen in FIG. 4, such details being also applicable to the mounting of wheel 35. Rectangular braces 37 and 38 are fixedly secured, respectively, to the top of side members 30 and 31, which braces each has longitudinal opening formed medially in the top thereof so that the brace is somewhat "U" shaped. An axle mounting bracket 39 and 40 is respectively bolted to the brace 37 and 38 and overly the longitudinal opening formed therein. A longitudinal slots 41 and 42 is formed in the bracket 39 and 40, respectively, and the inner end of the axle spindles 33 and 34 are received in the slots 41 and 42 and a nut threaded on the inner end of each of the spindles secures the spindle in the respective bracket. The axle spindles may be shifted fore and aft in the slots 41 and 42 as needed for weight transfer. A spring-shock 43 having variable dampening and spring rate adjustments such as a shock available from Koni under Part No. 7610-1277 has its lower adjustable end pivotally secured by a bolt in a bracket 44 secured medially to the top of the rear bar 32 and the top of the shock is pivotally secured by a bolt in a bracket 45 secured medially to the forward face of the rear cross member 18 so that the rear axle floats on a single swing arm design.

The wheel locking assemblies 46 are of conventional configuration and, when activated, abut the front end of the wheels 35 and 36. These assemblies are carried on the front ends of a pair of brake support brackets 47 and 48, the rear ends thereof being secured to the axle mounting brackets 39 and 40, respectively, so that the locks move unilaterally with the brackets and the wheels mounted therein.

The floating beam assembly 27 is mounted at the front end of the frame 10 by three gas charged spring shocks and includes a floating beam 49 medially carrying a foot rest and mounting on its lateral ends caster wheel mounting brackets 50 and 51 and being connected to the brackets 25 and 26 by four link control arms.

More particularly the floating beam assembly 27 includes a floating beam 49 having a foot rest 49A thereon which beam while extending laterally, is curved arcuately downwardly intermediate its ends and at its lateral ends terminates in mounting brackets 50 and 51 which brackets extend fore and aft of the beam 49. On the front ends of each of the brackets 50 and 51 is secured a castor wheel assembly 52 of conventional construction. Two links of the four link control arm structure are connected to the rear end of each bracket 50 and 51. A vertically elongated spacer bracket 53 is secured, as by bolting, to the inner-lower side of each of the brackets 25 and 26. To the lower end of each of the brackets 53 is bolted the rear end of a lower link 54 by a bolt 54A. with said rear end of the link being of a yoke configuration with one ear of the yoke being on the inside and the other being on the outside of the bracket and the yoke being pivotal relative to the associated bracket in a vertical direction only.

The front end of each lower link 54 has an opening therein receiving a shouldered bolt 54B, with the shoulder being of semi-spherical configuration so that the front end of each of the links 54 can pivot in a vertical plane relative to its associate bolt and also an move angularly relative thereto; each of the bolts being secured to the lower rear end of its associated mounting bracket 50. Each of the links 54 is made of two pieces which are screwed together such that the length of the link can be adjusted.

To the middle of each spacer bracket 53 is secured a shoulder bolt 55 which is received in an opening in the rear end of an upper link 56, with the shoulder portion being of semi-spherical configuration and received in the opening in the link 56 whereby the link 56 can pivot in a vertical plane relative to the bolt and also can move angularly relative thereto. It should be noted that the bolt 55 also secures the spacer bracket 55 to the attachment bracket 26 as does a bolt 57 which secures the top of the spacer bracket to the attachment bracket. Thus the rear ends of both the upper and lower links are attached to the attachment bracket.

The front end of each of the upper links 56 is secured to the top rear of the associated mounting bracket 50 by a shoulder bolt 58, the shoulder of which is received in an opening in the front end of the link 56 and said shoulder being of semi-cylindrical configuration, whereby the link 56 can pivot vertically relative to its associated mounting bracket 50, and also can move angularly relative thereto. Each of the upper links 56 is formed in three pieces, with the two end pieces threaded into the middle piece so that the length of the upper links 56, as well as the length of the lower links 54 can be adjusted to "tune" the suspension.

Figure 2:
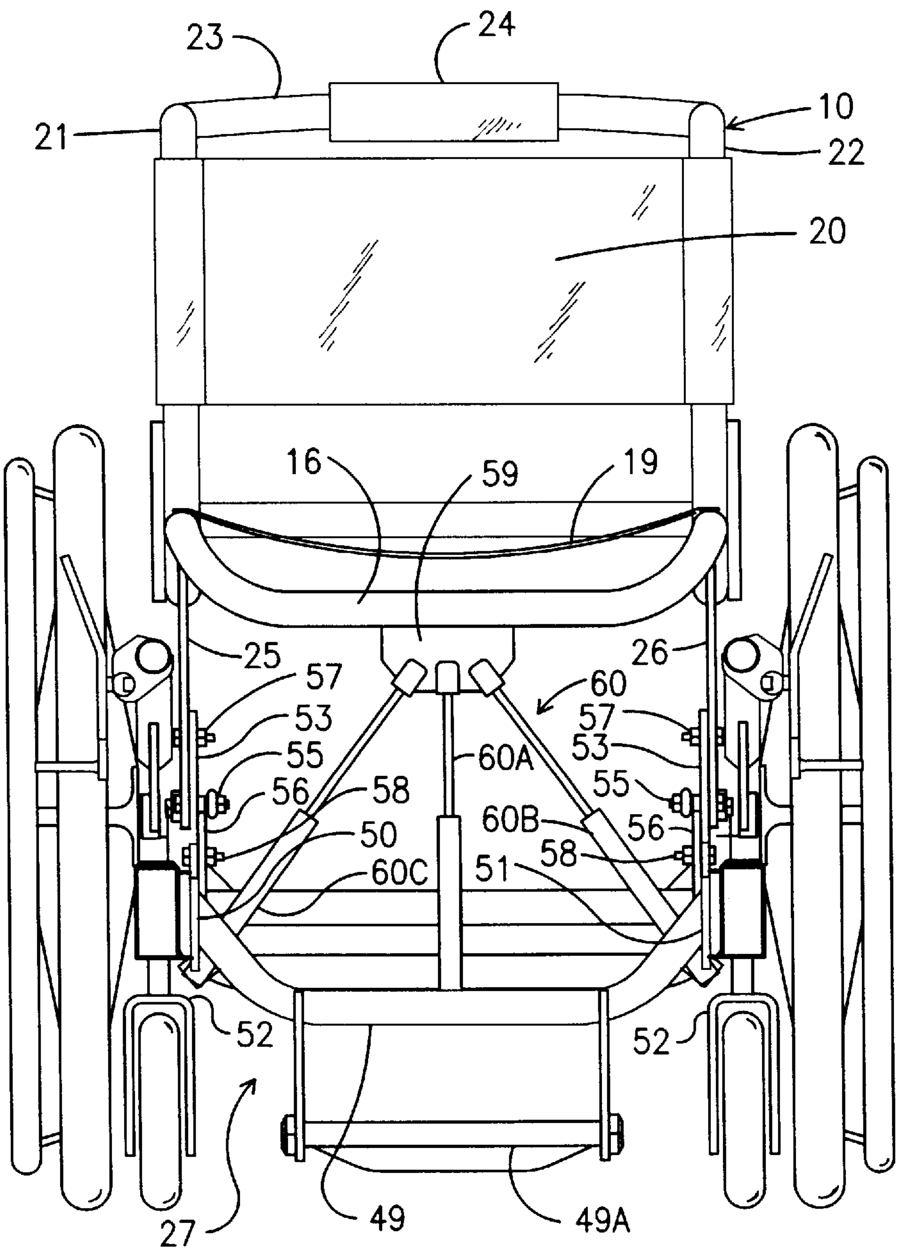
FIG. 2 is a front elevational view.
Figure 3:
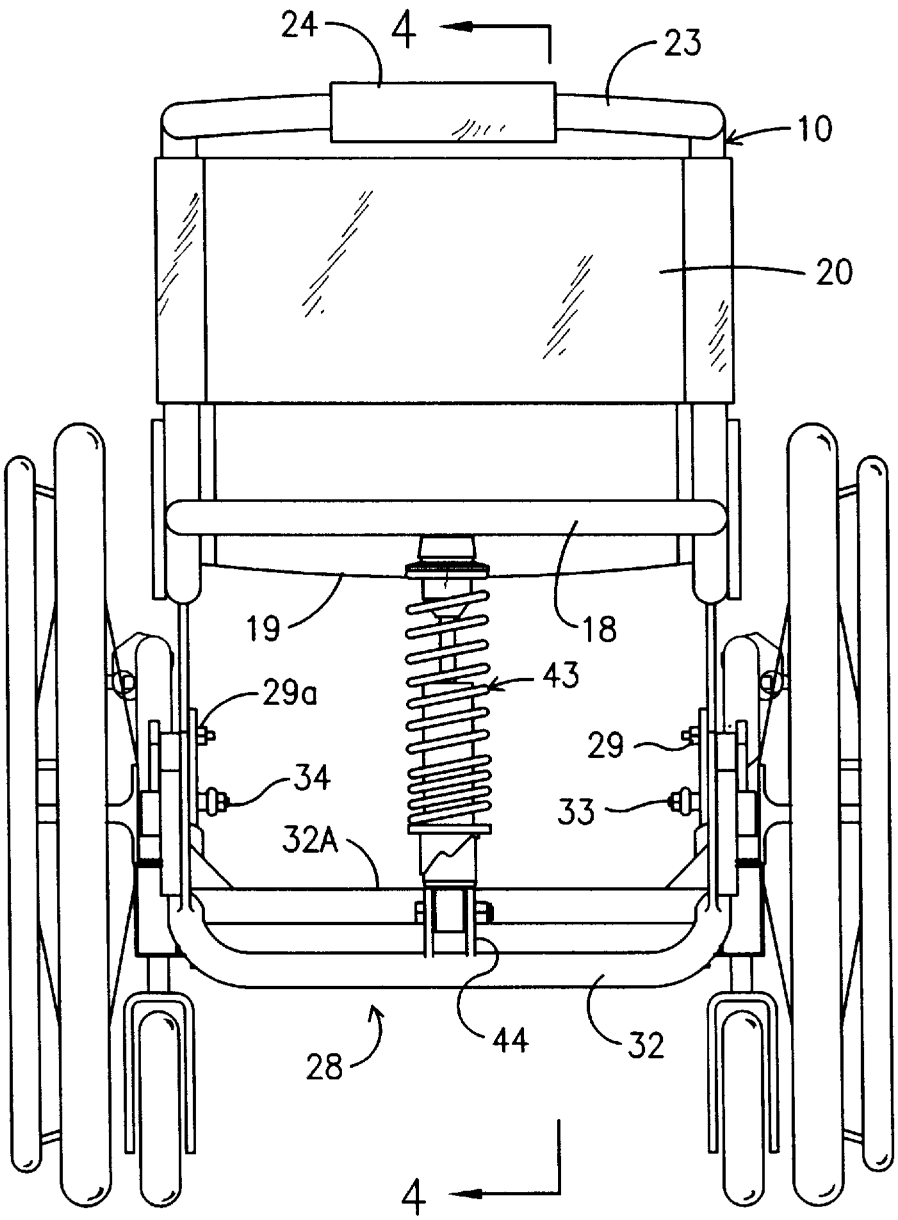
FIG. 3 is a rear elevational view.

Spring shock means 60 are disposed between the front of the frame 10 and the floating beam assembly 27 for controlling the relative movement thereof. More particularly a shock mounting bracket is secured to the middle of the front cross member 16 and the upper end of three gas charged spring shocks is bolted thereto with the bolt heads being in a spherical socket relationship to the shocks for free pivotal movement. The middle shock 60A extends straight down to and is secured to the middle of the floating beam 49 and, as seen in FIG. 2, the right shock 60B is angled to the right and is secured to the floating beam 49 adjacent its right end while the left shock 60C is angled to the left and is secured to the floating beam 49 adjacent the left end thereof, while all three shocks are angled slightly forwardly as seen in FIG. 1. The securement of the shocks to the beam 49 is by bolts with the bolt heads being in a spherical relationship to the shock for free pivotal movement.

The floating beam assembly which includes the castor wheel and the foot rest moves unitary relative to the frame and relative to the back wheels, while the back wheels move unitarily relative to the frame and the front wheels. The front wheels do not have to stay in the same plane as the back wheels and can independently move vertically relative to the plane of the back wheels.

The gas charged spring shocks do not have to be of the same spring rates. In a preferred embodiment, the outside shocks were labelled as 30 pounds while the center shock was 40 pounds. This provides vertical movement outside with minimal control to prevent front end diving. These shocks can be obtained from Spring Lift Corporation. The middle shock is identified as being SL-30, 40#; while the outside shocks were identified as SL32, 30#.

Figure 5:
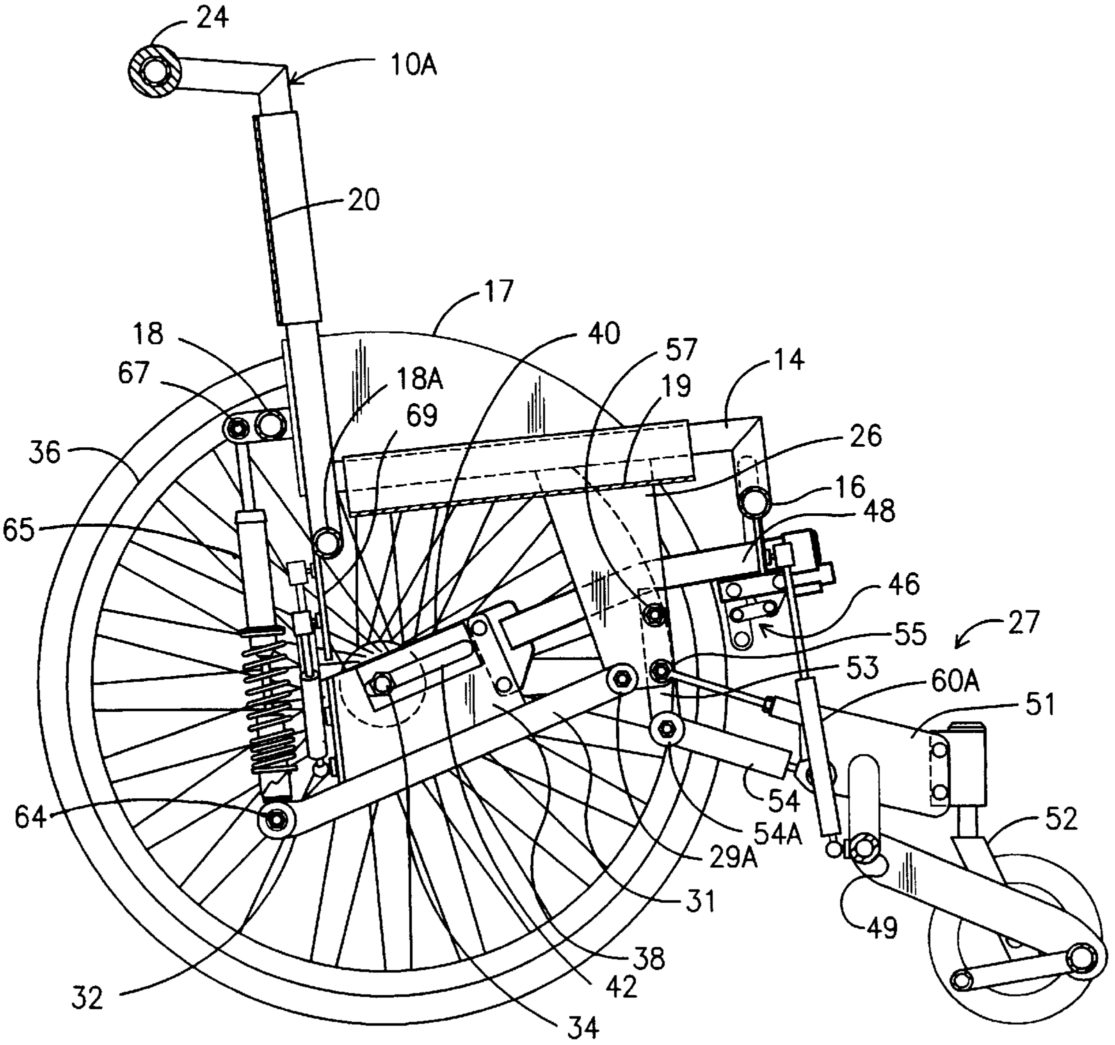
FIG. 5 is a sectional view taken in the manner of FIG. 4 but of a second embodiment of this invention.
Figure 6:
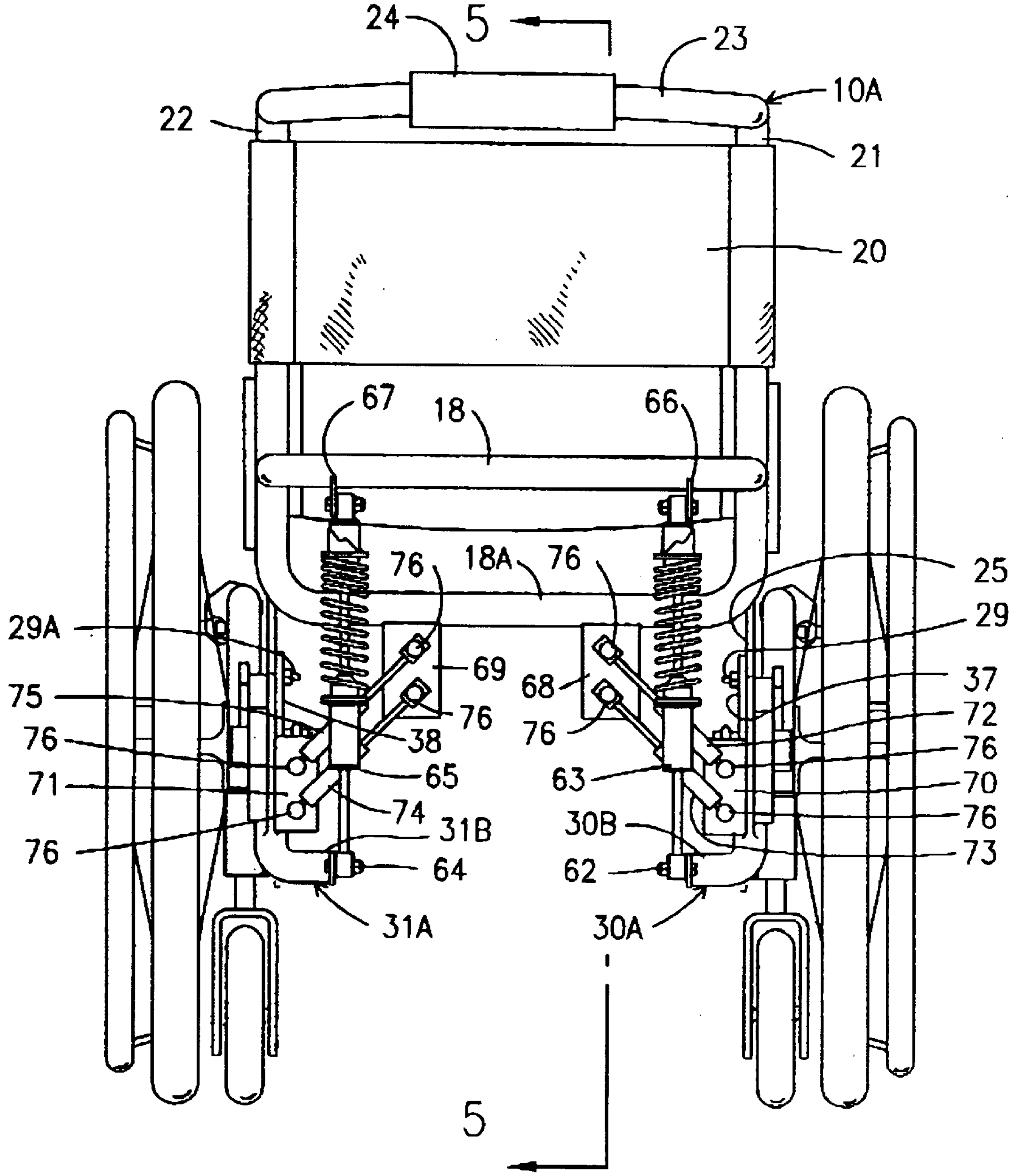
FIG. 6 is a rear elevational view of the embodiment of FIG. 5.

Referring now to the second embodiment having independent rear suspension, as seen in FIGS. 5 and 6, the front suspension is the same as for the first embodiment shown in FIGS. 1–4, while the differences in the seat construction and the rear suspension as seen in FIGS. 5 and 6 will be explained hereafter.

The side rails 12 and 14 of the seat frame shown generally at 10A includes, in addition to the rear cross member 18, a lower cross member 18A interconnecting the lower ends of the spaced back side rails 21 and 22. While in the first embodiment of FIGS. 1–4, the swing arm 32 was made of a one piece structure, in this second embodiment, as clearly shown in FIGS. 5 and 6, there are a pair of swing arms, one for each rear wheel, namely a right swing arm 30A, and a left swing arm 31A. The rectangular braces 37 and 38 arm fixedly secured to the top of the swing arms 30A and 31A, respectively, thereby mounting the rear wheels to the swing arms 30A and 31A, respectively in a manner like the rear wheels are mounted to the braces 37 and 38 carried by swing arm 32 of the embodiment of FIGS. 1–4. The front end (The right end as seen in FIG. 5) of the swing arm 31A is secured to the bottom of the seat carrying bracket by the bolt 29A while the front end of the swing arm 31A is secured to the bottom of the seat carrying 25 by the bolt 29A, while the front end of the swing arm 30A is secured to the bottom of the seat carrying bracket 25 by the bolt 29, with the securement allowing pivotal movement in a vertical direction. The swing arms 30A and 31A extend rearwardly and downwardly from the front ends thereof and the rear end of the arm 30A is turned inwardly at 30B, and the rear end of the arm 31A is turned inwardly at 31B. A bolt and nut assembly 62 secures the lower end of a spring shock absorber 63 to the rear end 30B of the swing arm 30A and a bolt and nut assembly 64 secures the lower end of a like spring shock absorber 65 to the rear end 31B of the swing arm 31A. The upper ends of the shock absorbers 63 and 65 are secured, respectively, to spaced brackets 66 and 67, secured as by welding, to the rear cross member 18 of the seat frame 10A, so that the shock absorbers independently cushion between the seat frame 10A and the control arms 30A and 31A. The spring shocks 63 and 65 have variable damping and spring rate adjustment, such as a shock absorber available from the Yamaha Motor Company under part number 3YJ22210-50.

Two links of a four link-control structure operatively connect the seat 10A to the swing arms 30A and 31A. More particularly, spaced brackets 68 and 69 are secured, as by welding, to the bottom rear of the lower cross member 18A of the seat 10A while upwardly extending brackets 70 and 71 are respectively secured, as by welding, to the top of the control arms 30A and 31A and also secured to the back edge of the brackets 37 and 38. A pair of links 72 and 73 connect the brackets 68 and 70, and a pair of links 74 and 75 connect the brackets 69 and 71. The links 72, 73, 74, and 75 are made of two pieces which are screwed together so the length thereof can be adjusted. The upper ends of the links 72 and 73 are secured to the bracket 70. Each of such securements is by a shouldered bolt 76 secured in the bracket and with the shouldered portion of the bolt being of semi-spherical configuration and being received an opening in the adjacent portion of the link, whereby the links can pivot in a vertical plane relative to the bolts and can also move angularly relative thereto.

Thus the rear wheels can move independently relative to the seat frame 10A as well as independently relative to the front wheel assemblies 52.

Although the above description relates to presently preferred embodiments, numerous changes can be made therein without departing from the scope of this invention as claimed in the following claims:

What is claimed is:

1. A wheel chair comprising a) a seat and back carrying frame having
   (1) a pair of spaced longitudinally extending side rails,
   (2) a front and a back cross member extending laterally between and connecting said side rails b) a separate front and a rear wheel carrying suspension for said frame, with said frame having laterally spaced frame connecting means thereon for separately connecting said suspensions to said frame, c) said front suspension including
   (1) a pair of laterally spaced castor wheels including mounting means thereon,
   (2) a laterally extending floating beam member with two end including laterally spaced mounting means thereon mounting said castor wheels thereto,
   (3) a first pair of link control arms connecting said mounting means on one of the ends of said floating beam member to said frame connecting means that is on the same lateral side of said frame and a second pair of link control arms connecting said mounting means on the end of said beam member opposite to said one end thereof to said frame connecting means on the same lateral end of said frame,
   (4) the connection between said control arms and said mounting means and said connecting means including pivoting connecting means,
   (5) a plurality of laterally spaced front spring shocks connected to said front cross member and to said floating beam member to allow for relative movement between said floating beam member and said frame, d) said rear suspension including
   (1) a swing arm having a pair of longitudinally extending side members interconnected at their rearward end and including means pivotally mounting the same for pivoting in a vertical direction relative to said frame connecting means,
   (2) a pair of rear wheel chair wheels
   (3) wheel connecting means connecting said wheels to said swing arm in a laterally spaced relationship, and
   (4) a rear shock absorber connected between said back cross member and said swing arm.

2. A wheel chair according to claim 1 wherein said rear shock absorber is a combined spring and shock absorber having variable dampening and spring rate adjustments.

3. A wheel chair according to claim 1 wherein the numbers of said front spring shocks is three with one of them being a middle shock disposed between the other outer two shocks, said middle shock extends downwardly between the medial portion of said front cross member and the medial portion of said floating beam and the other two shocks are connected medially on said front cross member and are connected to said floating beam adjacent the outer ends thereof.

4. A wheel chair according to claim 3 wherein said rear shock absorber is a combined spring and shock absorber having variable damping and spring rate adjustments.

5. A wheel chair according to claim 4 including brake means connected to said arm for selectively braking said wheels, whereby said brake means moves unitarily with said wheels and are always in a position to apply a braking force to said wheels.

6. A wheel chair according to claim 4 wherein said front spring shocks are gas charged spring shocks with said middle shock having a greater loading number than the other two shocks.

7. A wheel chair according to claim 4 wherein each of said wheel connecting means includes a bracket secured to said swing arm, a wheel axle spindle secured to said bracket, with said bracket including means for allowing said spindle to be moved relative thereto in a longitudinal direction.

8. A wheel chair according to claim 6 wherein said link control arms are adjustable in length.

9. A wheel chair according to claim 8 wherein at least some of said pivoting connecting means includes a semi spherical connecting member whereby vertical pivoting as well as relative angular movement is accommodated.

* * * * *